United States Patent [19]

Proulx et al.

[11] Patent Number: 4,919,182
[45] Date of Patent: Apr. 24, 1990

[54] MOTOR VEHICLE EMERGENCY TIRE TRACTION IMPROVEMENT DEVICE CONSISTING OF POLYMERIC ROPE

[76] Inventors: Stephen Proulx, 601 Newtown Rd., Littleton, Mass. 01460; Paul Rowe, 41 Watertown St., Lexington, Mass. 02173

[21] Appl. No.: 225,309

[22] Filed: Jul. 28, 1988

[51] Int. Cl.[5] .......................... B60C 27/16; E06C 5/26
[52] U.S. Cl. ............................... 152/221; 152/208; 182/199
[58] Field of Search ............... 152/213 R, 213 A, 221, 152/225, 208; 182/196–199, 206; 24/115 H, 136 K

[56] References Cited

U.S. PATENT DOCUMENTS

| 1,301,988 | 4/1919 | Weber | 152/221 |
| 1,520,287 | 12/1924 | Fauth | 152/221 |
| 1,718,509 | 6/1929 | West | 152/221 |
| 2,252,027 | 8/1941 | Pasquarella | 152/221 |
| 2,607,387 | 8/1952 | Martin | 152/221 |
| 4,234,027 | 11/1980 | Riedel | 152/221 |

FOREIGN PATENT DOCUMENTS 2654241  6/1977  Fed. Rep. of Germany ... 152/213 A

*Primary Examiner*—Robert A. Dawson
*Assistant Examiner*—Gregory J. Wilber
*Attorney, Agent, or Firm*—Hamilton, Brook, Smith & Reynolds

[57] ABSTRACT

An emergency motor vehicle tire traction improving device for attachment or mounting to a conventional motor vehicle tire is made substantially totally of multi-strand polymeric plastic rope and includes three or more separate lengths of the rope connected together in a pattern that defines a ladder having inside and outside parallel, coextensive runners and a plurality of transverse rungs connecting corresponding points of the runners, whereby the device is mounted to the tire by drapping it over the tire with the runners parallel with the direction of rotation of the tire and the rungs across the tire treads, with one end of each runner connected to the other end thereof and an elastic device attached to one of the runners pulling that runner uniformly toward the axis of the tire. When so mounted to the tire, the tire traction, particularly on ice and snow, is improved. All embodiments of the tire traction device are comprised of three or more separate lengths of the polymeric rope: one length provides one runner, another length provides the other runner and one or more other lengths provide the rungs that are threaded to the runners.

15 Claims, 7 Drawing Sheets

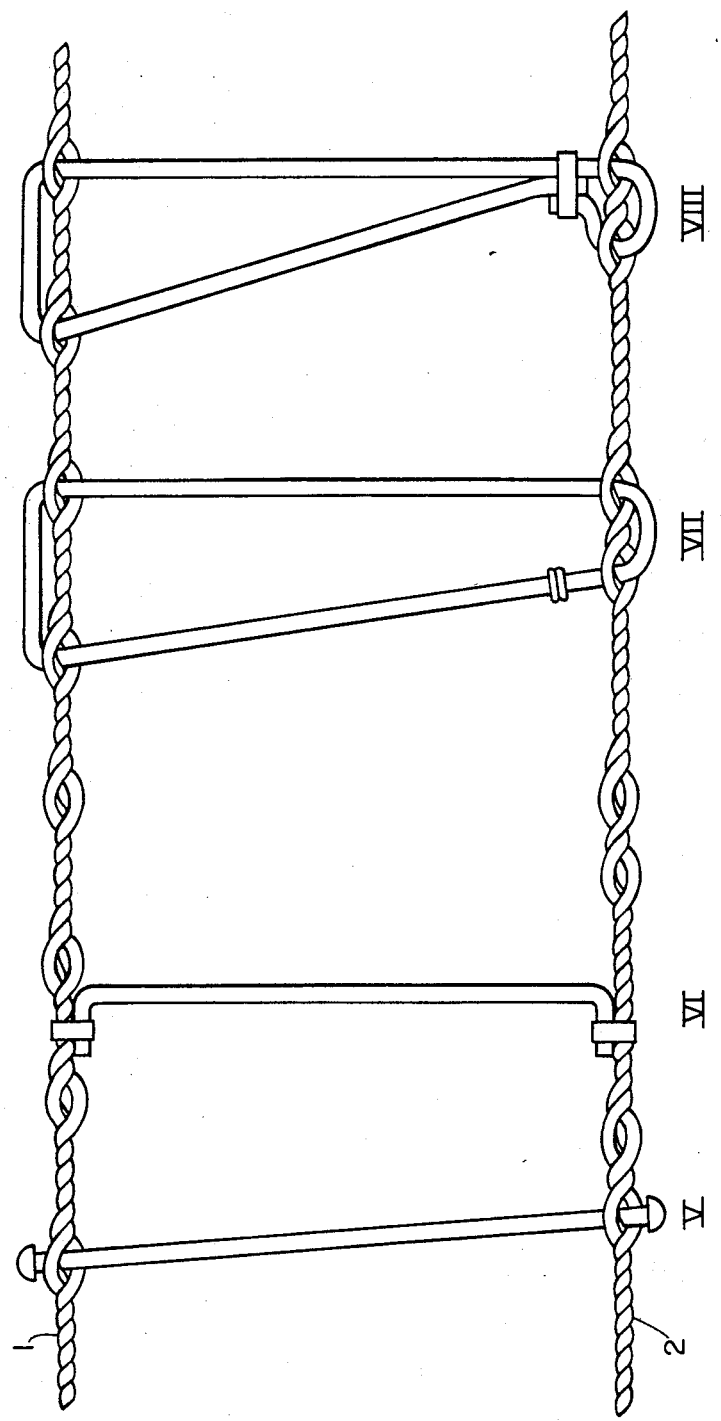

MOTOR VEHICLE EMERGENCY TIRE TRACTION IMPROVEMENT DEVICE CONSISTING OF POLYMERIC ROPE

FIELD OF THE INVENTION

This invention relates to motor vehicle emergency tire traction improvement devices (herein called tire traction devices) for attachment to conventional motor vehicle tires, usually when snow, ice or muddy conditions prevail, to improve tire traction.

BACKGROUND OF THE INVENTION

The most popular current emergency tire traction devices for motor vehicle tires are constructed of steel and are known as "steel link tire chains". Some of the problems with such steel link tire chains are listed below. If one could imagine similar tire traction attachments for motor vehicle tires made of polymeric plastic materials (herein referred to generally as plastic materials) instead of steel, then the problems with the steel link tire chains can be compared with corresponding plastic tire traction devices. Such a comparison might be as follows:

| Steel Link Tire Chains | Plastic Tire Traction Device |
| --- | --- |
| (a) Metal rusts | (a) Plastic does not rust |
| (b) Heavy - 10-25 pounds | (b) Light - 2-3 pounds |
| (c) Centrifugal forces large | (c) Centrifugal forces small |
| (d) Storage - entangles when rolled up | (d) Storage - does not entangle when rolled up |
| (e) Handling - difficult because heavy and cold | (e) Handling - easy, because light and not cold |
| (f) Handling - difficult because floppy | (f) Handling - easy, because tends to retain shape |
| (g) Cannot be used on dry pavement | (g) Can be used on dry pavement |
| (h) Noisy at high speed | (h) Quiet at high speed |
| (i) Damages tire | (i) No tire damage |
| (j) Dangerous if chain breaks and often damages vehicle | (j) No danger to vehicle or others if it breaks |
| (k) High fabrication cost | (k) Low fabrication cost (1/10 to 1/5 sale price of steel link chains) |
| (l) Installation - difficult requires skill | (l) Installation - easy no skill required |

Heretofore, efforts have been made to provide steel link tire chains for motor vehicles that are modified to overcome some of the above mentioned disadvantages of steel link tire chains. Those efforts include coating the steel links with plastic or rubber. Plastic coated steel tire chains links tends to make the chains less noisy and may reduce damage to the tire, however plastic coating increases the weight and cost and makes the chains more bulky, and the plastic coating does not contribute to strength and tends to wear off quickly, particularly where the plastic coating is impacted between the hard steel and the hard pavement.

SUMMARY OF THE INVENTION

It is an object of the present invention to provide emergency motor vehicle tire traction devices wherein some of the above mentioned limitations and disadvantages of steel link tire chains are avoided.

It is another object of the present invention to provide emergency motor vehicle tire traction devices wherein some of the above mentioned advantages gained by substituting plastic for the steel links are gained.

It is another object of the present invention to provide emergency motor vehicle tire traction devices made essentially totally of plastic materials.

In preferred embodiments of the present invention, an emergency motor vehicle tire traction device for attachment to a conventional motor vehicle tire is made substantially totally of polymeric multi-strand rope.

Several embodiments are described herein incorporating several different patterns of connected multi-strand polymeric ropes to provide a tire traction device similar in form (when laid out on the ground) to a conventional steel link tire chain, inasmuch as the form is ladder shaped. More particularly, when laid on the ground, the device has the appearance of a ladder with two long, side by side parallel members, each about the same length, slightly less than the perimeter length of the tire, and a plurality of transverse members connecting corresponding points of the long members. The two long members are referred to herein as "runners" and the transverse members are referred to as "rungs". The rungs perform the tire traction improvement function and the runners serve to hold the rungs on the tire tread.

The embodiments incorporate several different techniques of connecting together two ends of the same or different lengths of the rope and several different techniques of connecting the multi-strand polymeric ropes together along adjacent short (about one inch) sections of each rope. For example, the rope ends are connected by fusion bonding, weaving, molded plugs, knots, cable ties, and clamps and the adjacent short sections are connected together by a clamp or threading. The embodiments described herein show preferred patterns (forms) defined by the runner and rung members of connected ropes, referred to as "teardrop", "H" and "Z" patterns.

All embodiments use a single elastic cord, sometimes called a "bungee" to pull the emergency plastic tire traction device tightly about the tire with the rungs in position on the tire tread, across the tread, substantially perpendicular to the direction of rotation of the tire.

These and other features and objects of the present invention are apparent from the following specific description of the embodiments taken in conjunction with the drawings.

DESCRIPTION OF THE DRAWINGS

FIG. 5 illustrates several additional techniques of securing single rung and teardrop rung members to positions along the runners, fusing an end in a molded plug, fused butting ends and clamping, referred to herein as techniques V, VI, VII and VIII.

DESCRIPTION OF EMBODIMENTS OF THE INVENTIONS

Figure 1:
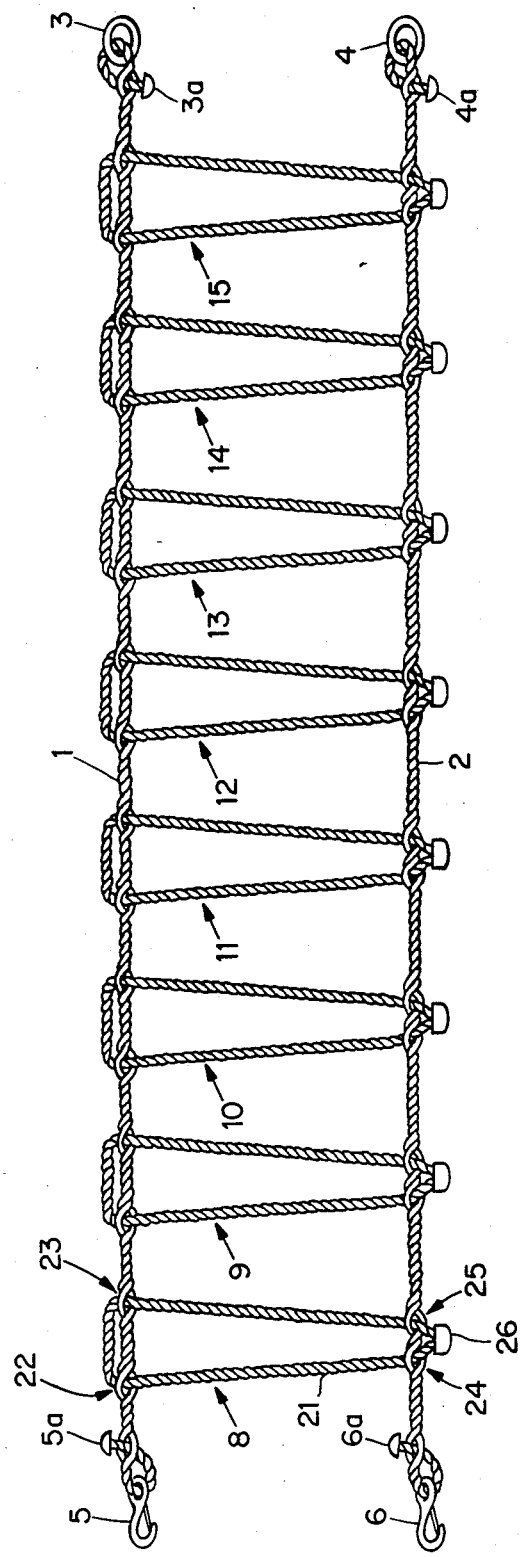
FIG. 1 is a plan view showing the plastic tire traction device, spread out, as though on the ground about to be attached to the tire of a conventional motor vehicle. This figure shows the pattern of polymeric multi-strand ropes referred to herein as the "teardrop" ladder pattern.

As mentioned above, the applicant has solved some of the problems encountered using steel link tire chains, to provide emergency traction devices for attachment to conventional motor vehicle tires by using polymeric plastic rope instead of steel links. In this effort, the applicant has discovered that:

1. Traction improving devices made from lightweight plastic rope can be attached to the tread of a tire transverse to the direction of rotation of the tire by wrapping a ladder shaped assembly of the ropes around the periphery of the tire.

2. Satisfactory traction improvement performance is achieved for such a device having rung members up to six inches apart that are made from 3/16 inch diameter, or greater, polymeric rope installed by wrapping a ladder shaped device having rungs of the polymeric plastic rope around the tire.

3. Particularly good traction improvement performance is achieved for such a device having rung members up to six inches apart that are made from ¼ inch diameter, or greater, twisted, multi-strand polymeric plastic rope installed on the tire by wrapping a ladder shaped device carrying the rung members around the tire.

4. Satisfactory durability of such a traction device is achieved particularly when the rope member connections are at points on the device that are against the sides of the tire rather than on the treads of the tire.

5. Satisfactory connections can be achieved by fusion bonding, weaving, or using molded fused plugs, plastic cable ties, or even knots.

6. Satisfactory connections can also be achieved with metal clamps, particularly when the rope member connections are at points on the device that are against the sides of the tire rather than on the treads of the tire.

7. Satisfactory traction and durability can be achieved with any of a number of the form patterns described herein, such as the "teardrop", "H", and "Z" patterns.

8. The use of pre-formed plastic or metal clamps as a means of joining rope to itself or joining snap hooks and rings at the ends of each runner is satisfactory.

9. Lead connectors, grommets and other friction fit fasteners are suitable as means of joining the rope to itself or joining snap hooks and rings at the ends of each runner.

10. The use of fusion bonding to connect the ends of butting rope is satisfactory.

11. The use of melted polymeric plugs for fusion bonding the ends of polymeric rope for making rungs is preferred.

12. Melted polymeric plugs connecting the ends of rope tend to prevent the woven (twisted) pattern of multi-strand polymeric plastic rope from unraveling.

13. The use of molded polymeric plastic plugs to attach snap hooks, rings, or clips to the ends of polymeric rope is satisfactory.

14. The use of polymeric plastic pellets, granules, or flakes heated to fuse on the rope, rather than a pre-molded plug attached to the rope and heated to make the molten plug connection, is a useful technique.

15. The use of a single elastic cord (bungee) to secure the device to the tire, attached on the outside of the tire using a self-tightening "star" pattern is preferred.

All embodiments of the emergency tire traction device described herein, when spread on the ground, have the shape of a ladder, more or less. As mentioned above, for convenience of description, the steps, or transverse members of the ladder are called "rungs" and the rungs are held between the longer members of the ladder called "runners". In all embodiments, there are two runners and they are made of twisted, multi-strand polymeric plastic rope, preferably at least ¼ inch in diameter. The length L of the runner is calculated by the following formula in which D is the tire diameter in inches:

$$L = \pi(D-6)$$

The rungs are preferably also made of twisted, multi-strand polymeric plastic rope and may be heavier rope than the runners. Using extra heavy rope for the rungs gives better traction and wear. The number of rungs or rungs per foot of tire periphery should be sufficient to keep the device firmly on the tire and is usually more than needed just to provide satisfactory traction. There should be about twelve such rungs for the small tires of compact cars (about six inches apart) and sixteen rungs for larger tires such as used on vans. The width W of a rung is calculated by the following formula in which T is the tire tread width in inches:

$$W = (T+6)$$

The length of a piece of the rope R1 in inches to make a teardrop pattern rung loop (two adjacent rungs) is calculated by the following formula:

$$R1 = [(T+6) \times 2] + 4$$

TEARDROP PATTERN RUNG LADDER

The teardrop pattern rung ladder is shown in FIG. 1. This figure shows the complete tire traction device laid out to show all parts. It includes the inside and outside runners 1 and 2, respectively, each with a ring 3 and 4 at one end and a snap hook 5 and 6 at the other end. Runners 1 and 2 are ⅜ inch diameter, multi-strand, twisted, polymeric plastic rope.

The rungs are formed in pairs 8 to 15. Each pair (such as pair 8) is a teardrop-shaped length, preferably of ⅜ inch diameter multi-strand, twisted, polymeric plastic rope 21, that threads through the strands of runner 1 at two places 22 and 23 and threads through the strands of runner 2 at two places 24 and 25 and the ends thereof connect together on the outside side of runner 2 by a molded polymeric plastic plug 26 fused to the ends. In this example, the two points 22 and 23 along the inside runner 1 are farther apart than the two points 24 and 25 along outside runner 2. This is what makes the teardrop shape of the rope 21 forming the rung pair shown in FIG. 1.

At the points of connection 22 to 25 along runners 1 and 2, the rope 21 is threaded through and hence only loosely intertwines with the strands of the runner as shown. This loose intertwining may be accomplished using the method and apparatus shown in FIGS. 6A and 6B discussed later. The molded fusion bonded polymeric plastic plugs like 26 are approximately one inch in diameter, and about one inch long when used for the rungs as shown in FIG. 1. Similar fusion bonded plugs can be used to secure the snap hooks 5 and 6 and rings 3 and 4 at opposite ends of the runners, but the fusion plugs 3a to 6a that secure rings and snap hooks 3 to 6 are reduced in size to about ½ inch by ½ inch. The device is installed with the side having the large plugs 26 securing the teardrop rungs facing away from the vehicle. This insures that the plugs 26 will not strike the suspension, axle, or brake lines of the vehicle. The plug shape is preferably made rounded on the side facing away from the runners, and angled facing towards the runners. For plugs 3a to 6a for the rings and snap hooks, this insures that the plugs will not slip back through the twisted polymeric plastic runner rope. The snap hooks 5 and 6 and rings 3 and 4 are large enough to fit on the end of the runners and are corrosion resistant. They may be made of stainless steel, galvanized steel or some other non-corrosive material.

Figure 7:
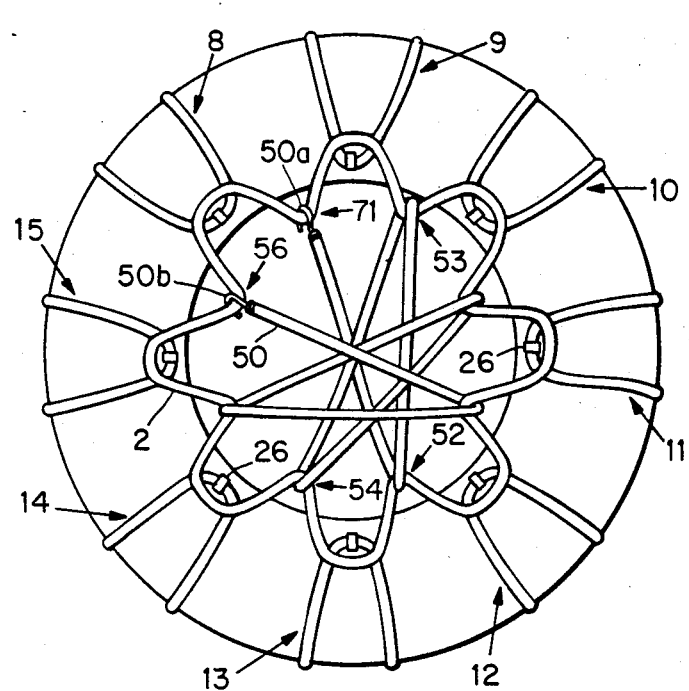
FIG. 7 shows an emergency tire traction device of the present invention installed (mounted) on a tire and secured with a bungee according to the present invention.

When the traction device is mounted on a tire, a closed elastic bungee of conventional type with up to eight hooks on it may be fastened to outside runner 2 with the bungee hooks between the pairs of teardrop rungs. A preferred bungee is shown installed in FIG. 7. Here, the bungee 50 is not a closed (continuous) elastic; it has two ends and a rubber or plastic coated steel hook at each end. It is installed as shown in a star pattern. First hook 50a is hooked onto outside runner 2 at point 51. Then the bungee is stretched radially across the wheel to the opposing point 52 on runner 2 and looped around the runner at that point. Then the bungee is stretched and looped around the runner at point 53; and then to point 54; and so on. Finally the hook 50b is hooked onto runner 2 at point 56. The bungee, installed this way pulls runner 2 to define a star as shown. Other bungee tightening configurations are suitable.

A foam plastic mat about two feet by three feet by ⅜ inch thick may be packaged with two or more of the tire traction devices for a vehicle. The mat is used to roll up the devices and can also be used as an insulating waterproof ground pad when mounting the traction devices on the vehicle tires.

The teardrop shaped rung pattern shown in FIG. 1 has certain advantages when compared with the "H" and "Z" patterns shown in FIGS. 2 and 3 and described below. The advantages include lower material and labor cost. The teardrop pattern and the H and Z patterns of rungs all avoid rung crossover on the tire tread which would result in excessive rope wear. The teardrop pattern traction device is relatively easier to "drape" over the tire than the H or Z pattern traction devices.

H PATTERN RUNG LADDER

Figure 2:
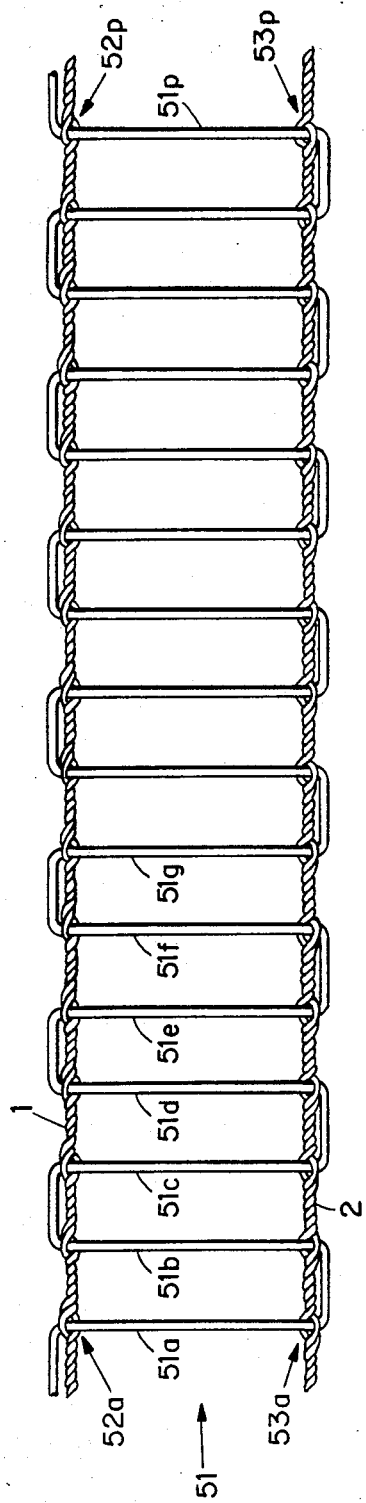
FIG. 2 shows the "H" ladder pattern where a single length of rope provides many or all of the rungs between runners.

FIG. 2 shows an alternative pattern, herein called the "H" ladder pattern. In this design all or many of the rings denoted 51a to 51p are formed by one "continuous" rope 51 which is threaded through both the runners at evenly spaced points 52a to 52p on runner 1 and 53a to 53p of runner 2. The advantage to this pattern compared with the teardrop pattern is the elimination of bonding of rungs to rungs. The disadvantage is the labor intensive weaving process although that process can be facilitated using the apparatus and process shown in FIGS. 6a and 6b. Another disadvantage is the less favorable draping and entangling characteristics of this design during installation on a tire. Also, if one rung breaks, the entire device fails.

Z PATTERN RUNG LADDER

Figure 3:
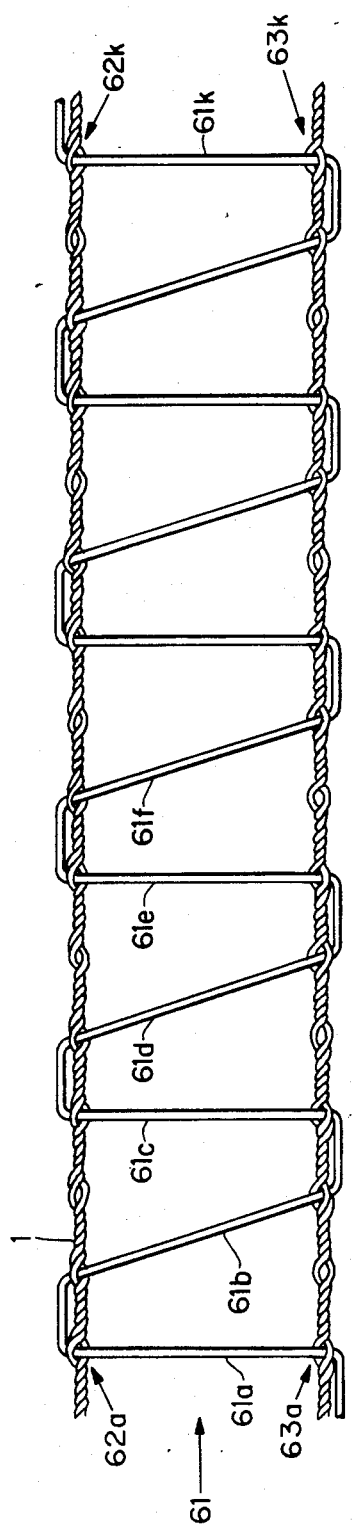
FIG. 3 shows the "Z" ladder pattern where a single length of rope provides many or all of the rungs between runners.

FIG. 3 shows another alternative ladder design using a "Z" rung pattern. In this design there is also one "continuous" rung 61 which is threaded through both the runners. Here, the points 62a to 62k along runner 1 and 63a to 63k along runner 2 are not evenly spaced, but alternate in each runner and are staggered in one runner with respect to the other runner. The result is the Z pattern of rungs 61a to 61k. The advantages and disadvantages of this design compared with the teardrop pattern are the same as for the H pattern.

APPARATUS AND METHOD FOR THREADING RUNGS TO RUNNERS

Figure 6A:
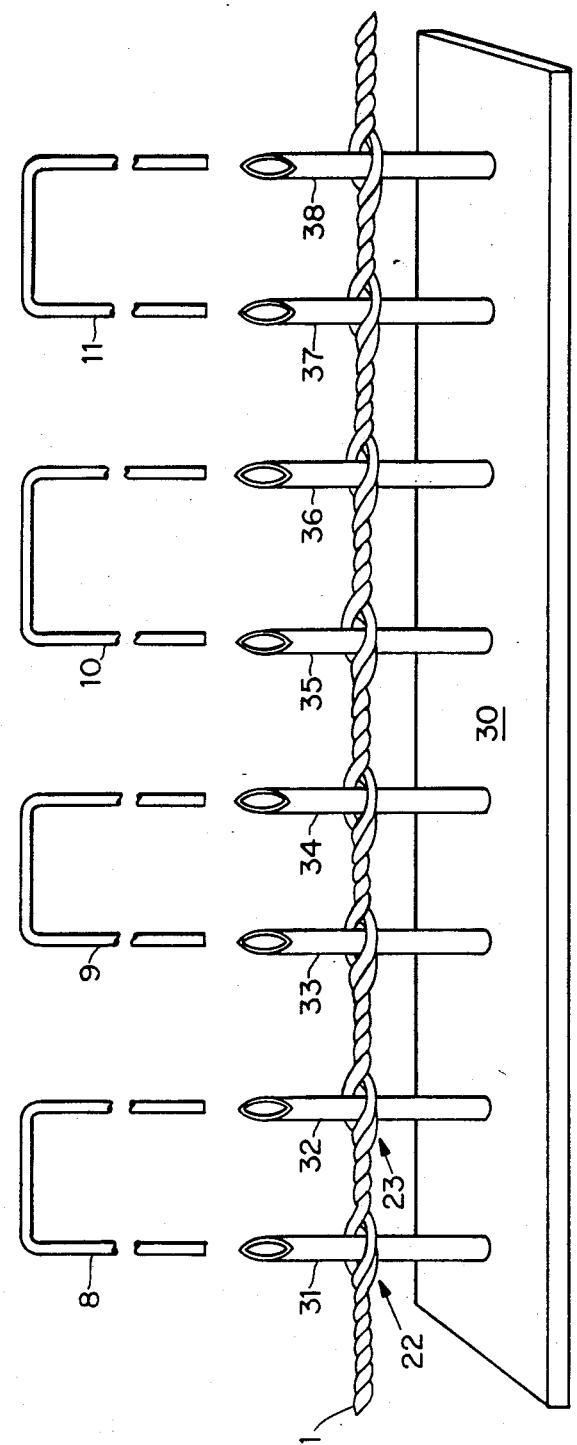
FIGS. 6A and 6B shows apparatus and a method for threading rungs to the runners.
Figure 6B:
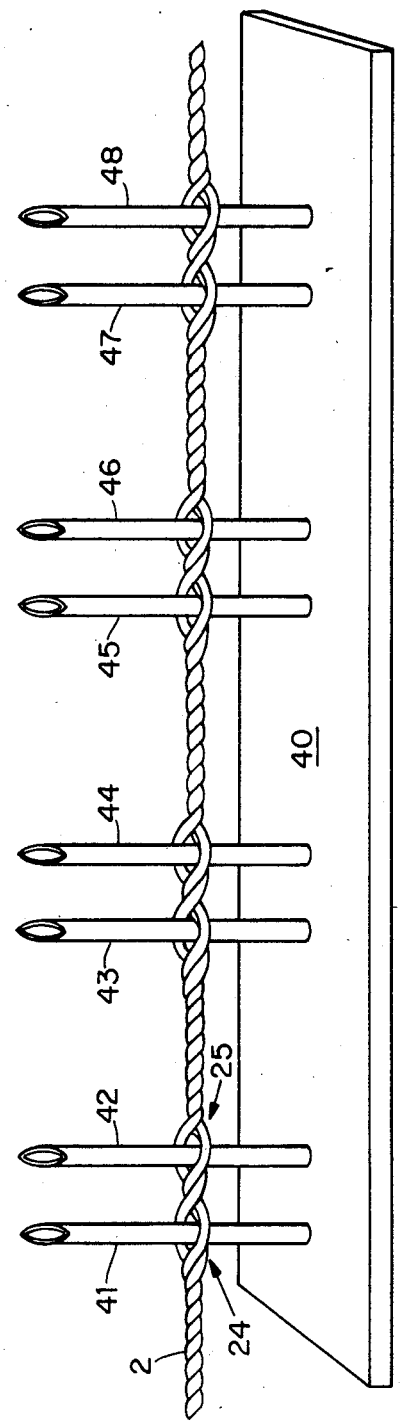

Apparatus and a method for threading rungs through strands of the runners for the teardrop pattern shown in FIG. 1 are shown in FIGS. 6A and 6B. Threading is accomplished by using numerous polyvinyl chloride (PVC) tubes with an inside diameter greater than the rung rope outside diameter, each tube having a sharpened end to facilitate insertion laterally (threading) through or between strands of the twisted multi-strand polymeric plastic runners. According to the technique shown in FIGS. 6A and 6B, the tubes are carried on a table at the intervals at which threading is to be done.

Two such tables of tubes are prepared, Table 30 for inside runner 1, (the runner that faces the axle on the tire) and Table 40 for outside runner 2 (the runner that faces away from the vehicle). First runner 1 is threaded onto the sharpened end of tubes 31 to 38 on table 30 as shown in FIG. 6A. The ends of the teardrop rung pairs 8 to 11 are then inserted into the tubes as shown, runner 1 is withdrawn from the tubes and onto the teardrop rung pairs so that the rungs are now threaded to runner 1. Then the ends of the rungs are withdrawn from the tubes.

Meanwhile, runner 2 has been threaded over a different series of such tubes 41 to 48 on table 40 which are spaced appropriately for that runner. The ends of the rung pairs already threaded through runner 1 are then inserted into tubes 41 to 48, runner 2 is withdrawn from these tubes and onto the teardrop rung pairs so that the rungs are now threaded to runner 2, and then the ends of the rungs are withdrawn from tubes 41 to 48. The ladder pattern is now ready for fusion bonding of plugs on the ends of the rungs along the outside of runner 2. As seen in FIGS. 6a and 6b and in FIG. 1, the threaded connections are "slipable" in that the rope (21) forming the rungs is free to slip through and within the strands of the runners 1 and 2, being restricted only from slipping free of the runners by the polymeric plug joining the two ends of the rung rope together.

FUSION BONDING

Figure 4:
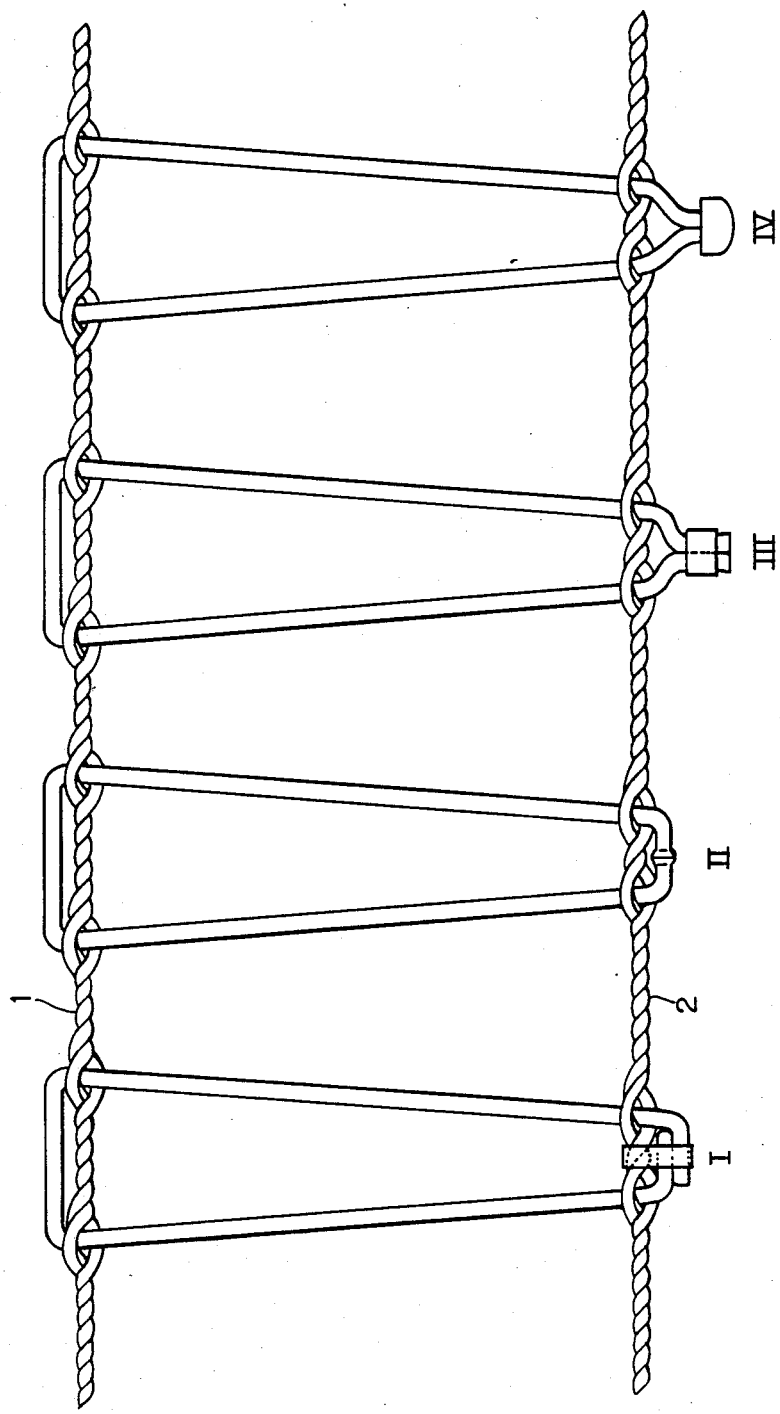
FIG. 4 illustrates several rope connecting techniques of securing teardrop rung members to positions along runners referred to herein as techniques I, II, III and IV, including band clamps, fused butting ends and fusing contiguous ends in a molded plug.

Fusion bonded plugs connecting rope ends have bond strengths in excess of 200 pounds and are highly reliable. They are impact resistant, waterproof, lightweight, and will not damage the tire sidewall. FIGS. 4 and 5 show eight alternative rung bonding techniques, most as applied to the teardrop pattern. These rung bondings are denoted I through VIII.

Bonding IV shows the most preferred rung attachment technique as described above with reference to FIG. 1. Bonding V shows attachment of a single rung by fusion bonding plugs onto rungs at both runner sides.

Bondings I, III, VI and VIII all use mechanical fasteners to attach the rungs. The mechanical fasteners can be, for example, BAND-IT brand sold by BAND-IT Company of Denver, Colo., or other equivalent friction fit fasteners. Plastic friction fit fasteners can be used, but typically metal friction fit fasteners are stronger and more reliable. Bondings II and VII show a teardrop rung pair bonding technique where the two butted ends of the polymeric plastic rope are melted and fused together. Because of the high orientation in certain polymeric plastic rope strands such as polypropylene plastic, the rope strands tend to unravel during heating, making this bond somewhat difficult to control and reproduce.

The process for melting polymeric plastic plugs (particularly polypropylene plastic plugs) is as follows: A metallic block is heated by electric resistance heaters wherein temperature is controlled to keep the temperature at the melting point of polypropylene, or up to 600 degrees F. or more if faster heating cycles are desired. A molded polypropylene plug, or preferably, polypropylene resin in the form of powder or flakes, is inserted in a metal cup. The cup is then inserted in the heated metal block. In 10-25 minutes the molded plug or resin becomes a relatively low viscosity melt. A pair of rope ends from a teardrop rung pair is then inserted into the melt for 1-10 seconds or more then withdrawn and cooled in a water bath. This process is repeated for all the teardrop rung pairs.

Additional plugs are placed on the ropes to attach snap hooks, rings, or clips to the end of each runner.

Joining two ends of polypropylene rope without using metal clamps or bands, as done with a polypropylene plug provides a connection that will not rust or corrode and has no hard edges that might cut the tire. Since many kinds of the highly oriented polymeric (such as polypropylene) rope tends to unravel at high temperature, it is very difficult to simply heat the abutting or overlapping ends of ropes to, in effect, fuse them together. The same technique can also be used to join one piece of polymeric plastic rope (such as polypropylene rope) to a snap hook or ring. This technique is many times less costly in both materials and labor than using metal fasteners.

The small air bubbles left in the melted polymeric plastic provides improved impact resistance against shattering. Apparently, the small entrapped air bubbles interfere with crack propagation. This property is important in sub-zero winter temperatures and affords a pleasing appearance.

Polymeric plastic materials suitable for all ropes and plugs described herein include polypropylene, polyethylene, nylon and polyester.

INSTALLATION OF TIRE TRACTION DEVICE ON A TIRE

The steps to mount the tire traction device on a tire are as follows: The device shown in FIG. 1 is unrolled from the storage package, draped over the tire with runner 2 (the outside runner facing away from the vehicle. The bungee 50 shown in FIG. 7 can be used to facilitate pulling the snap hook 5 or ring 3 from the inside runner 1 into view so as to more easily make the connection between ring 3 and snap hook 5 on the axle side of the tire. Ring 4 and snap hook 6 are then connected on outside runner 2, which faces away from the vehicle. Then the elastic bungee is used to tighten runner 2 as described hereinabove with reference to FIG. 7. The large elongation of the elastic bungee ensures that the emergency tire traction device fit to the tire will be "self-tightening". The elastic force of the bungee is more than sufficient to keep this relatively lightweight emergency plastic tire traction device from flying off the tire at vehicle speeds of over 45 miles per hour.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A traction improvement device for attachment to a motor vehicle tire to improve said tire traction when the motor vehicle is driven on ice and snow or in mud, comprising:
   (a) at least two longitudinally oriented lengths of multi-strand twisted rope in which the strands are made of polymeric plastic, each length of rope forming a runner and being less than the perimeter length of said tire;
   (b) one or more other transversely oriented lengths of multi-strand twisted rope in which the strands are made of polymeric plastic, the transversely oriented lengths being essentially transverse to the runners and extending between said runners, each transversely oriented length having one end threaded through the strands of at least one of the runners and an opposite end threaded through the strands of at least an other runner to form slippable connections with the runners, the connections thereof to said runners being spaced along each of said runners and defining a plurality of transverse members, said transverse members being formed in pairs, each pair being formed by a single, transversely oriented length of rope threaded through one or more places of each of said runners, said runners and said transverse members defining a ladder-like arrangement of which said runners are separated by a dimension greater than the width of said tire; and means at the ends of each of said runners for connecting said runner ends together, such that said tire traction device is attachable to said tire with said runners on opposite sides of said tire, each runner following generally the periphery of said tire and said transverse members are arranged around the periphery of said tire each being oriented substantially perpendicular to said runners and to the direction of rotation of said tire rotation.

2. A device as claimed in claim 1 wherein each of said single lengths of rope forming transverse members has two ends that are immediately adjacent each other and connected together.

3. A device as claimed in claim 1 wherein for each pair of transverse members formed by a single length of said rope, the places through which the single length of rope is threaded are spaced farther apart along one of said runners than along the other of said runners.

4. A device as claimed in claim 1 wherein the length of said length of said rope forming a pair of transverse members exceeds twice the distance between said runners and ends of the single length are connected together by a fused polymeric plastic plug.

5. A device as in claim 1 wherein said transverse members are formed by a continuous unbroken length of rope passed through the two sets of strands of the unners at a plurality of opposed points along said two runners, there being a separate passing point along a runner for each transverse member connected thereto.

6. A device as in claim 5 wherein said transverse members are parallel to each other.

7. A device as in claim 6 wherein said transverse members are perpendicular to the direction of rotation of said tire.

8. A device as in claim 5 wherein adjacent transverse members are not parallel to each other and define an acute angle there between.

9. A device as in claim 8 wherein adjacent of said acute angles are equal and oppositely directed.

10. A device as in claim 5 wherein alternate of said transverse members are parallel to each other and there are two sets of said alternate members of which one set is not parallel to the other.

11. A traction improvement device for attachment to a motor vehicle tire to improve said tire traction when the motor vehicle is driven on ice and snow or in mud, comprising:
   (a) at least two longitudinally oriented lengths of multi-strand twisted rope in which the strands are made of polymeric plastic, each length of rope forming a runner and being less than the perimeter length of said tire;
   (b) one or more other transversely oriented lengths of multi-strand twisted rope in which the strands are made of polymeric plastic, the transversely oriented lengths being essentially transverse to the runners and extending between said runners, each transversely oriented length having one end threaded through the strands of at least one of the runners and an opposite end threaded through the strands of at least an other runner to form slippable connections with the runners, the connections thereof to said runners being spaced along each of said runners and defining a plurality of transverse members, each of said transverse members being formed of a transversely oriented length of said rope threaded through the strands of said runners and having a fused polypropylene plug at each end of the transversely oriented length of rope to prevent each end from pulling away from the associated runner through the strands of said runner, said runners and said transverse members defining a ladder-like arrangement of which said runners are separated by a dimension greater than the width of said tire; and
   means at the ends of each of said runners for connecting said runner ends together,
   such that said tire traction device is attachable to said tire with said runners on opposite sides of said tire, each runner following generally the periphery of said tire and said transverse members are arranged around the periphery of said tire each being oriented substantially perpendicular to said runners and to the direction of rotation of said tire rotation.

12. A traction improvement device for attachment to a motor vehicle tire comprising:
   a plurality of longitudinally oriented lengths of multi-strand twisted rope, each length forming a runner, at least two runners being separated by a dimension greater than the width of the tire and each having a length shorter than the perimeter length of the tire;
   a plurality of transverse members, each member being of multi-strand twisted rope extending transversely between the two separated runners and passing between the strands of the runners to form threaded connections at points of intersection between the transverse member and the two runners, the transverse members being arranged in pairs, each pair being formed by a single length of rope which passes between the strands at two different points of each of the two runners to form two threaded connections with each of the two runners, the threaded connections loosely retaining the transverse members in essentially transverse positions relative to the runners, the threaded connections being spaced apart along the lengths of the runners such that each transverse member is an independent link between the runners; and
   connectors at the ends of each runner for connecting the runner ends together to attach the device to a tire.

13. A device as claimed in claim 12 wherein each of said single lengths of rope forming a pair of transverse members has two ends that are immediately adjacent to each other and connected together.

14. A device as in claim 12 wherein said transverse members are formed by an unbroken length of rope passed through respective sets of strands of the two separated runners at a plurality of opposed points along the runners and extending between the two runners at the opposed points, there being a separate rotationally slippable threaded connection point along a runner for each transverse member.

15. A traction improvement device for attachment to a motor vehicle tire comprising:
   a plurality of longitudinally oriented lengths of multi-strand twisted rope, each length forming a runner, at least two runners being separated by a dimension greater than the width of the tire and each having a length shorter than the perimeter length of the tire;
   a plurality of transverse members, each member being of multi-strand twisted rope extending transversely between the two separated runners and passing between the strands of the runners to form threaded connections at points of intersection between the transverse member and the two runners, each of said transverse members being formed of a length of rope threaded between the strands of each of the two separated runners and having a fused polypropylene plug at each end of the length of rope to prevent each end from pulling away from an associated runner through the strands of said runner, the threaded connections loosely retaining the transverse members in essentially transverse positions relative to the runners, the threaded connections being spaced apart along the lengths of the runners such that each transverse member is an independent link between the runners; and
   connectors at the ends of each runner for connecting the runner ends together to attach the device to a tire.

* * * * *